March 7, 1939. J. P. SPANG 2,149,638
MEAT-SLITTING MACHINE
Filed Feb. 21, 1936 6 Sheets-Sheet 2

Inventor:
Joseph P. Spang
by Heard Smith & Tennant.
Attys.

March 7, 1939.  J. P. SPANG  2,149,638
MEAT-SLITTING MACHINE
Filed Feb. 21, 1936  6 Sheets-Sheet 3

Inventor.
Joseph P. Spang
by Heard Smith & Tennant
Attys.

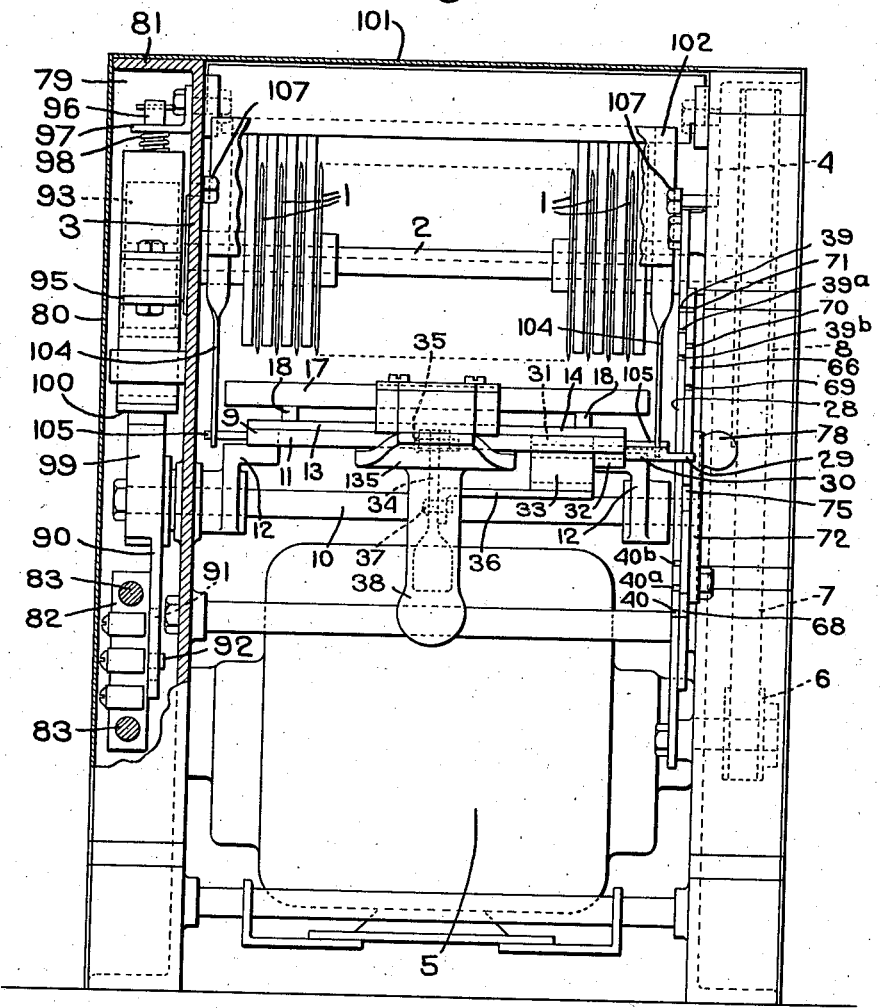

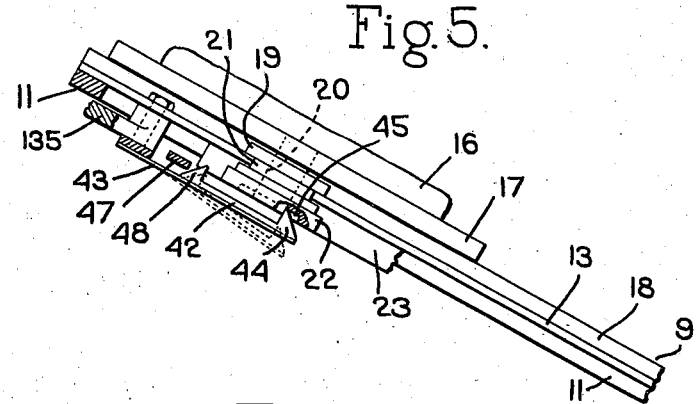

March 7, 1939. J. P. SPANG 2,149,638
MEAT-SLITTING MACHINE
Filed Feb. 21, 1936  6 Sheets-Sheet 6
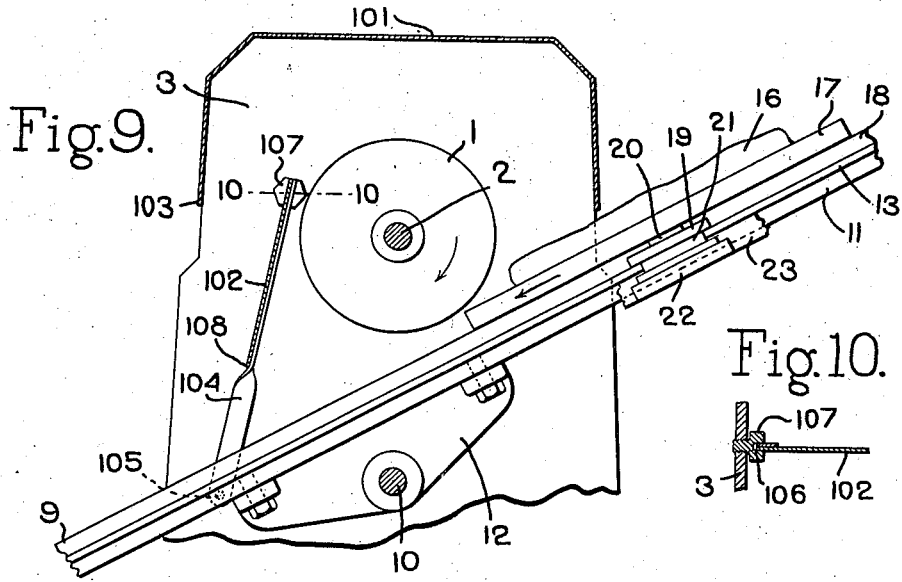
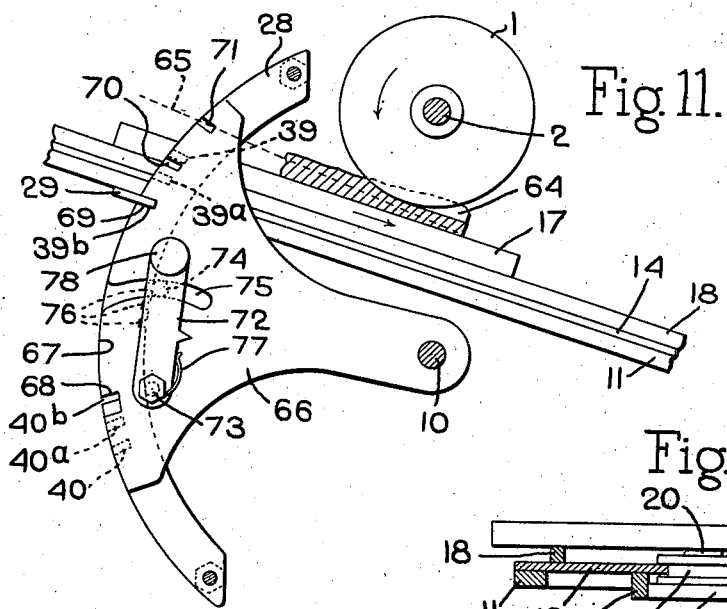
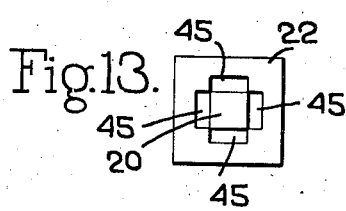
Inventor.
Joseph P. Spang
by Heard Smith & Tennant.
Attys.

Patented Mar. 7, 1939

2,149,638

UNITED STATES PATENT OFFICE 2,149,638

MEAT-SLITTING MACHINE

Joseph P. Spang, Quincy, Mass.

Application February 21, 1936, Serial No. 65,044

27 Claims. (Cl. 17—27)

This invention relates to meat-slitting machines of the type which includes an inclined platform situated beneath the slitting knives together with means for conveying the slices of meat to be slit from the upper end to the lower end of the platform past the knives, thereby to cause the slits to be cut in the meat.

One object of the invention is to provide an improved meat-slitting machine of this type which is constructed so that the angular position of the platform can be varied thereby to vary the depth of the slit cut in the meat.

A further object of the invention is to provide a meat-slitting machine of this type in which the platform is a rocking platform swingable from a position in which one end is elevated to a reverse position in which the other end is elevated, and in which the meat is conveyed from the upper to the lower end of the platform on a turntable together with means to turn the table after it has made one pass beneath the knives so that upon the second pass the slits will be cut in the meat at an angle to those made during the first pass of the meat.

A further object of the invention is to provide means for normally locking the table at the upper end of the tilting platform and means for locking the tilting platform in position which latter means is constructed to release the lock for the table simultaneously with the locking of the platform in its operative position.

A further object of the invention is to provide a meat-slitting machine having a tilting platform with power-driven slitting knives and means for reversing the direction of rotation of the slitting knives as the inclination of the platform is reversed.

Other objects of the invention are to improve meat-slitting machines of this type in various particulars such as will be more fully hereinafter set forth.

In the drawings wherein I have illustrated a selected embodiment of the invention, Fig. 1 is a side view of a meat-slitting machine with the cover plate for one of the end frames removed.

Fig. 4 is an end view with the platform in horizontal position and with part broken out.

Fig. 5 is a fragmentary view showing the means for locking the turntable to the platform.

Fig. 6 is a fragmentary view showing the operation of turning the turntable.

Fig. 7 is a section on the line 7—7, Fig. 6.

Fig. 8 is a section on the line 8—8, Fig. 7.

Fig. 9 is a fragmentary sectional view illustrating the guard for the knives.

Fig. 10 is a section on the line 10—10, Fig. 9.

Fig. 11 is a view showing the adjustment of the platform for cutting slits of different depths.

Fig. 12 is a transverse section for the platform 10 showing the manner in which the turntable is provided.

Fig. 13 is a view of the under side of the block 19.

Figure 1:
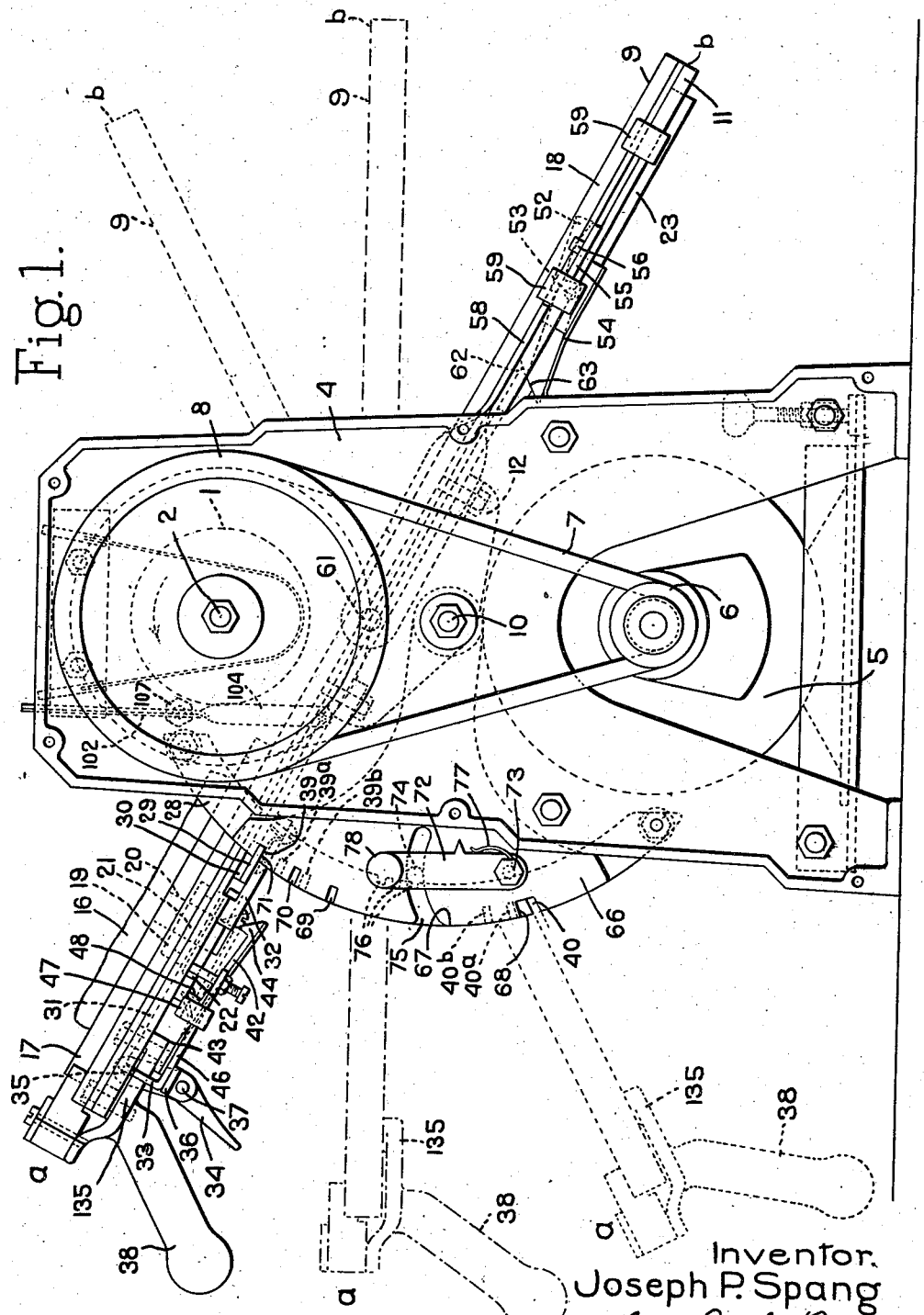

The knives of the meat-slitting machine are in the form of rotary disk knives 1 which are mounted on a shaft 2 journalled in the end frames 3 and 4 of the main supporting frame. These knives are power-driven from a suitable motor 5 carried by the base portion of the frame, said motor having a driving pulley 6 which is belted by means of a belt 7 to a larger pulley 8 on the knife shaft 2.

9 indicates the swinging or tiltable platform which is situated beneath the knives and is shown as mounted on a rocker shaft 10 journalled in the end frames 3 and 4, said platform 9 being tiltable from an inclined position shown in full lines, Fig. 1, to a reverse inclined position shown in the dotted lines. The platform is made with a frame portion 11 to which is secured the bearing brackets 12 that are fast on the shaft 10, and which carry two plates 13 and 14 that form between them a guiding slot 15.

The slice of meat 16 to be slit is conveyed from one end to the other of the platform on a meat-supporting table 17 which rests on two rails 18 carried by the plates 13 and 14 and which is guided in its movement by the guiding slot 15. The table 17 has rigid therewith a guiding block 19, said block being fast on a stud 20 which is secured to and depends from the table 17. This guiding block 19 is provided with an annular groove 21 which occupies the slot 15 and in which the inner edges of the guiding plates 13 and 14 are received. The lower end of the guiding block 19 has the square guiding portion 22, one side of which rests against a guiding rib 23 on the underside of the plate 13. This guiding rib cooperates with the flat face of the guiding portion 22 to prevent the table 17 from turning during its travel from one end to the other of the platform.

In using the meat-slitting machine the tilting table 9 is first placed in a horizontal position as shown in the dot-and-dash lines in Fig. 1 and a slice of meat 16 is placed on the table 17, the latter being at this time locked to the platform at the end *a* thereof. The platform is then swung into its first inclined position shown in full lines Fig. 1 with the end *a* elevated, the table is unlocked and moves downwardly to the lower end of the platform 9 thereby carrying the meat underneath the knives 1 with the result that the slits will be cut in the meat.

The swinging platform 9 is then swung into the reversely-inclined position shown in dotted lines, Fig. 1, which operation raises into elevated position the right-hand end *b* of the platform which then has the meat-supporting table thereon. Such meat-supporting table is then moved downwardly from the elevated right-hand end *b* of the platform, to the lower left-hand end *a* so that the meat will be conveyed under the knives a second time.

The table 17 is preferably in the form of a turntable and means are provided for giving the table a turning movement after it has made its first pass beneath the knives and before it makes the second pass so that the series of slits which are cut in the meat during the second pass beneath the knives will be at an angle to and crossing those which were first made in the meat. For thus turning the turntable I employ a device similar to that illustrated in my co-pending application Serial No. 64,850, filed February 29, 1936, and which comprises a dog 24 pivoted at 25 in an opening 26 formed in the guiding rail 23, said dog being acted on by a spring 27 normally holding it in its operative position shown in Fig. 3. As the turntable 17 approaches the lower end *b* of the platform when the latter is in the full line position, Fig. 1, the flat face of the guiding portion 22 is carried by the nose of the dog 24, the latter swinging backwardly against the action of the spring 27 to permit this operation. When the turntable 17 moves in the other direction after the platform 9 has been swung into its dotted line position, Fig. 1, one corner of the square portion 22 will engage the dog 24 so that continued movement of the turntable longitudinally of the slot 15 will give said turntable a turning movement through 90°.

Means are provided for releasably locking the swinging platform 9 in either of its two inclined positions represented by the full and dotted lines in Fig. 1. For this purpose there is provided a locking segment 28 secured to the end frame 4 and provided with a plurality of notches adapted to receive a locking latch 29 carried by the platform. This locking latch 29 is on the end of an arm 30 secured to and extending from a slide 31 which rests against the underside of the plate 14 and is retained in position by suitable guides 32. Said slide has attached thereto one end of a pulling spring 41, the other end of which is anchored to the platform. At the left-hand end said slide is provided with the depending portion 33 which is connected to a finger-piece 34 pivoted at 35 to a bracket 135 secured to the underside of the platform 9. The depending portion 33 of the slide has a laterally-extending arm 36 rigid therewith which is pivoted at 37 to the finger-piece 34 intermediate of its ends.

The platform 9 is shown as having a handhold 38 depending from its underside and when the operator grasps this handhold and presses on the finger-piece 34 with his fingers to swing said finger-piece toward the left, Fig. 1, such movement will move the slide to the left and thus withdraw the latch portion 29 from the notch in the quadrant 28. This quadrant 28 is provided with a notch for locking the platform 9 either in the full line position shown in Fig. 1 or in the reversely-inclined dotted line position, Fig. 1. The notch for locking the platform in the full line position is indicated at 39 and that for locking the platform in the dotted line position, Fig. 1 is indicated at 40.

Means are provided for normally locking the turntable 17 at the left-hand end of the platform in Fig. 1, which means are released by the operation of locking the platform in its operative inclined position.

When the machine is to be used the operator will swing the platform in the midway position shown by the dot-and-dash lines in Fig. 1 and will then place the slice 16 of meat on the turntable 17. At this time the turntable is locked to the platform. The operator then swings the platform into the first inclined position shown in full lines, Fig. 1, and then releases the finger-piece 34 whereby the spring 41 will move the slide 31 forwardly to carry the latch 29 into locking engagement with the notch 39. This forward movement of the slide releases the lock for the turntable so that the latter is then free to move downwardly over the platform to carry the meat beneath the knives. The lock for the turntable comprises a locking latch 42 which is carried on a spring arm 43 secured at its left-hand end to the bracket 135 (see Fig. 5). The nose 44 of this latch 42 is adapted to engage in any one of a plurality of recesses 45 formed in the under face of the guiding portion 22, the spring arm 43 yieldingly holding the nose 44 in locking engagement with the recess. The depending portion 33 of the slide 31 has a forwardly-extending portion 46 which carries a latch-releasing dog 47 adapted to engage the beveled face 48 on the rear end of the latch 42 when the slide is moved forwardly to bring the platform-locking latch 29 into the notch 39. The engagement of the dog 47 against the cam face 48 during such forward movement of the slide depresses the latch 42, as shown in full lines Fig. 1 and dotted lines Fig. 5, thereby releasing it from locking engagement with the turntable and freeing the latter for its downward movement. Such movement is partially at least a gravitational movement although the operator may, if desired, apply any force necessary to start the turntable downwardly.

It will be understood that the knives are rotating very rapidly and if at this time they are rotating counter-clockwise in Fig. 1 the action of the knives on the meat will augment the action of gravity in feeding the turntable past the knives.

It will be remembered that as the turntable 17 approaches the lower end *b* of the platform in Fig. 1, the guiding block 22 wipes past the spring-pressed dog 24. Said dog will serve to retain the turntable temporarily at said end *b* of the platform when the latter is shifted from the first inclined position shown in full lines, Fig. 1, to the reversely-inclined position shown in dotted lines with the end *b* elevated.

In order to thus swing the platform it is necessary first to release the platform-locking latch 29 by pulling backwardly on the finger-piece 34 and after the platform has been swung into the reversely-inclined dotted line position, Fig. 1, then the finger-piece 34 is again released to allow the platform-locking latch 29 to enter the notch 40.

There is provided means whereby when the platform-locking latch 29 is engaged in the notch 40 the turntable 17 will be given an initial movement toward the left, Fig. 1, sufficent to carry it past the dog 24 and to cause the turning movement of the turntable, and thereafter the turntable with the meat thereon will gravitate downwardly underneath the knives 1, which cut the second series of slits in the meat.

If at this time the knives are rotating clockwise in Fig. 1 the action of the knives on the meat will augment the action of gravity in feeding the turntable forwardly.

The means for initiating the downward movement of the turntable 17 from the end b of the platform comprises a lever 49 pivoted to the platform 9 at 50 and acted on by a spring 51 which tends to move it forwardly away from the end b of said platform. This lever 49 is normally held in its retracted position with the spring 51 under tension by means of a latch 52 pivoted to the platform 9 at 53 and acted on by a spring 54 which normally tends to hold it in the full line or operative position shown in Fig. 7.

Means are provided whereby when the platform-locking latch 29 enters the notch 40 in the quadrant 28 to lock the platform in the dotted line inclined position, Fig. 1, the latch 52 will be raised, as shown in dotted lines, Fig. 7, thereby releasing the lever 49, and as soon as this occurs the pulling action of the spring 51 will swing the lever 49 from the full toward the dotted line position, Fig. 6. During this movement said lever engages the block 19 which is fast on the stud 20 of the turntable 17, thereby moving the block and the turntable forwardly in the direction of the arrow c, Fig. 6. During this movement the corner of the square portion 22 of the block engages the dog 24 so that during the continued movement of the turntable in the direction of the arrow c said turntable will be given a quarter turn about its axis, as shown in Fig. 6 so that when the meat is carried beneath the knives in its travel from the end b of the platform to the end a thereof the slits which the knives cut in the meat will extend at right angles to those which were cut when the meat made its first pass beneath the knives.

The latch 52 is released from the lever 49 when the platform-locking latch 29 enters the notch 40 through the movement of the slide 31. It will be remembered that the latch 29 is carried by the slide 31 and moves therewith. The end of the slide 31 is provided with a beveled surface 62 (see Fig. 7) which is adapted to engage the beveled end 63 of the latch 52 when the slide has its operative movement by which the latch 29 is moved into the notch 40 and the engagement of the beveled faces 62, 63 serves to move the left-hand end of the notch downwardly and raise the right or operative end thereof, as shown in dotted lines Fig. 7, such movement of the latch releasing the lever 49.

A restoring mechanism is provided for restoring the lever 49 from the dotted line position in Fig. 6 to its retracted position when the platform is swung from the dotted line position, Fig. 1, to the full line position so that said lever 49 will be restored into its operative position ready to act on the turntable the next time it has traveled from the end a of the platform to the end b thereof.

The lever 49 extends beyond its pivot 50, as shown at 55, and this extension is provided with an upstanding pin 56 situated in a notch 57 formed in the edge of a restoring slide 58. This slide extends through two guides 59 and the forward end thereof is connected to a stud 61 extending from the frame end 4. Since the anchoring stud 61 is situated above the axis 10 of the platform it will follow that when the platform is swung from the dotted line position, Fig. 1, to the full line position the restoring slide 58 will be moved lengthwise of the platform in a direction away from the end b and into the dotted line position, Fig. 3. During this movement the end wall 60 of the slot 57 engages the stud 56, thereby swinging the lever 49 into the dotted line position, Fig. 3, and at the same time placing the spring 51 under increased tension. So long as the platform 9 remains in the full line position, Fig. 1, the arm 49 will be held in its retracted position by the engagement of the pin 56 with the wall 60 of the notch.

Figure 3:
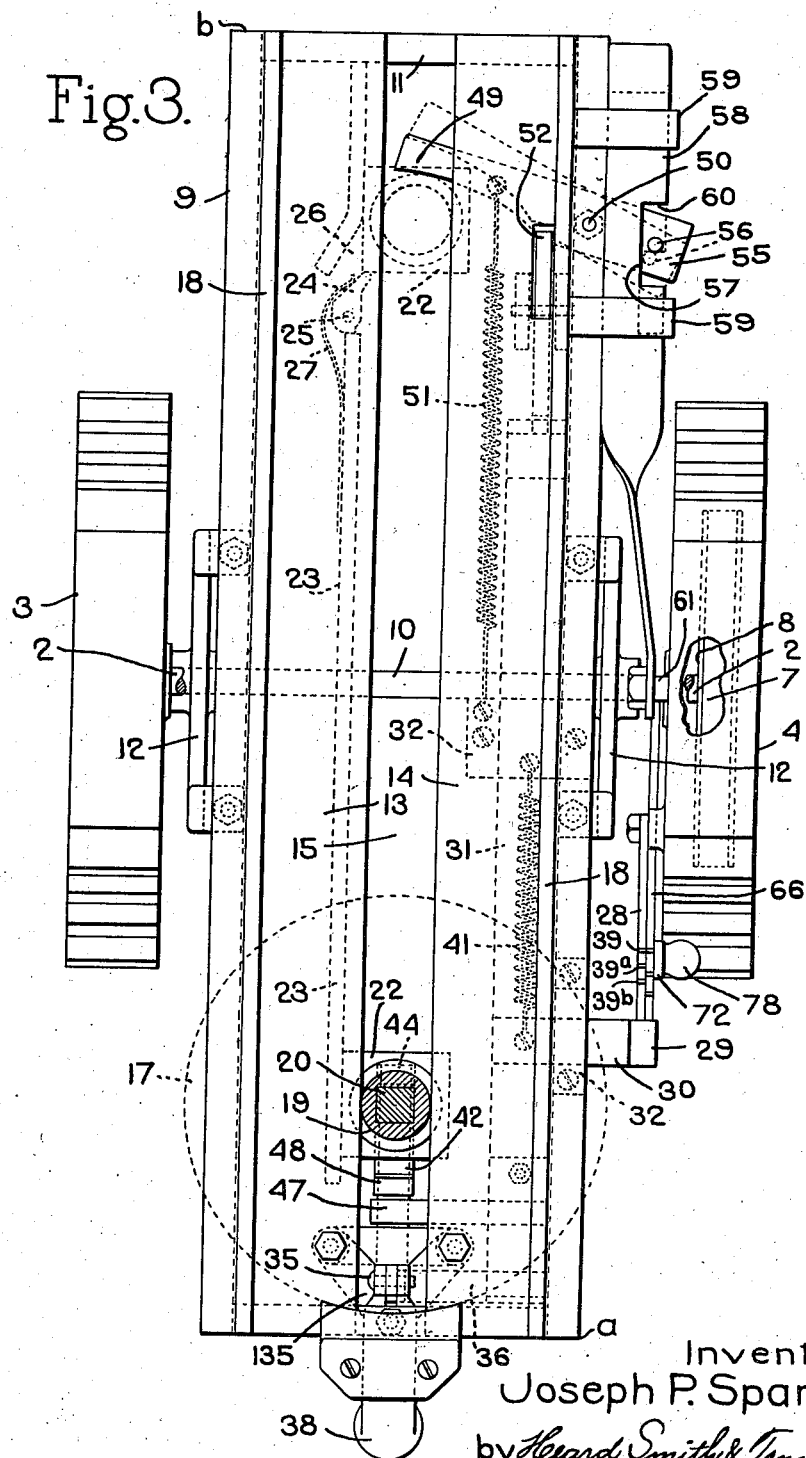
Fig. 3 is a plan view with the knives broken out to show better the construction of the platform.

When the lever 49 is in its retracted position shown in dotted lines, Fig. 3, it has been carried back of the latch 52. When the platform 9 is swung from the full to the dotted line position, Fig. 1, the restoring slide 58 will be moved backwardly relative to the platform, thereby releasing the lever 49 but at this time the latch 52 is in its operative position to engage the lever 49 and retain it in its rearward position, as shown in Fig. 7, and said lever 49 will thus be held retracted until the platform-locking latch 29 has been engaged in the notch 40 to lock the platform in the dotted line position, Fig. 1, such movement releasing the latch 52 as above-described.

The machine herein shown is also constructed to cut slits of different depths in the meat and this is accomplished by adjusting the inclined position of the platform during the meat-slitting operation. With the platform at the inclination shown in Fig. 1 the knives will cut a slit substantially through the meat because as the turntable moves downwardly over the platform the upper edge of the turntable just clears the knives. If, on the other hand, the platform is adjusted into a less inclined position than that shown in Fig. 1, as shown in full lines, Fig. 11, then the turntable 7 is separated somewhat from the knives so that as the meat is carried beneath the knives by the downward movement of the turntable the slits 64 which are cut in the meat will be of less depth than when the platform is in the position shown in Fig. 1.

Again if the platform is adjusted into an inclined position between that shown in Fig. 11 and the shown in Fig. 1 so that the upper surface of the turntable will be traveling in the plane represented by the dotted line 65 in Fig. 11 then the slits 64 which are cut in the meat will have a greater depth than when the platform is adjusted in the full line position, Fig. 11, but a less depth than when the platform is in the full line position, Fig. 1.

To provide for adjusting the platform at these various inclinations the quadrant 28 is formed with a plurality of notches at its upper end, as shown at 39, 39a and 39b, and a second group of notches at its lower end, as shown at 40, 40a and 40b. If it is desired to cut relatively shallow slits in the meat, as shown in the full lines, Fig. 11, then when the platform 9 is swung into either of its two inclined positions the platform-locking latch will be engaged with either the notches 39b or 40b. If it is desired to cut deeper slits in the meat then the platform-locking latch 29 will be engaged in the notches 39a or 40a and if it is desired to cut slits of the maximum depth in the meat then the locking latch will be engaged with the two notches 39, 40 when the platform is in its two inclined positions.

In order to make it easy to enter the locking latch 29 into the desired notch I have provided a guard member which is associated with the quadrant and which can be adjusted into different positions, thereby to uncover the desired notches in the quadrant and to cover the other notches so that in any adjusted position of the guard member a pair of notches only will be opened to receive the locking latch 29. This guard member is shown at 66 and is illustrated as pivotally mounted on the rocker shaft 10. The outer edge 67 of the guard member is flush and coincides with the outer edge of the quadrant 28. The guard member is provided at its lower portion with a wide notch 68 and at its portion with three notches 69, 70 and 71. This guard member 66 can be swung about the shaft 10 and when in one position, as that shown in Fig. 1, the notch 68 of the guard member registers with the notch 40 of the quadrant and the notch 71 of the guard member registers with the notch 39 of the quadrant. The other notches of the quadrant are closed by the guard member so that the only open notches are the notches 39 and 40. Consequently, it is easy for the operator to shift the platform from one inclined position to the other and to engage the locking latch 29 in the proper notches. If the guard member 66 is shifted upwardly from the position shown in Fig. 1 to that shown in Fig. 11 then the notch 68 of the guard member will register with the notch 40b of the quadrant and the notch 69 of the guard member will register with the notch 39b, the other notches of the quadrant being closed by the guard member.

Figure 2:
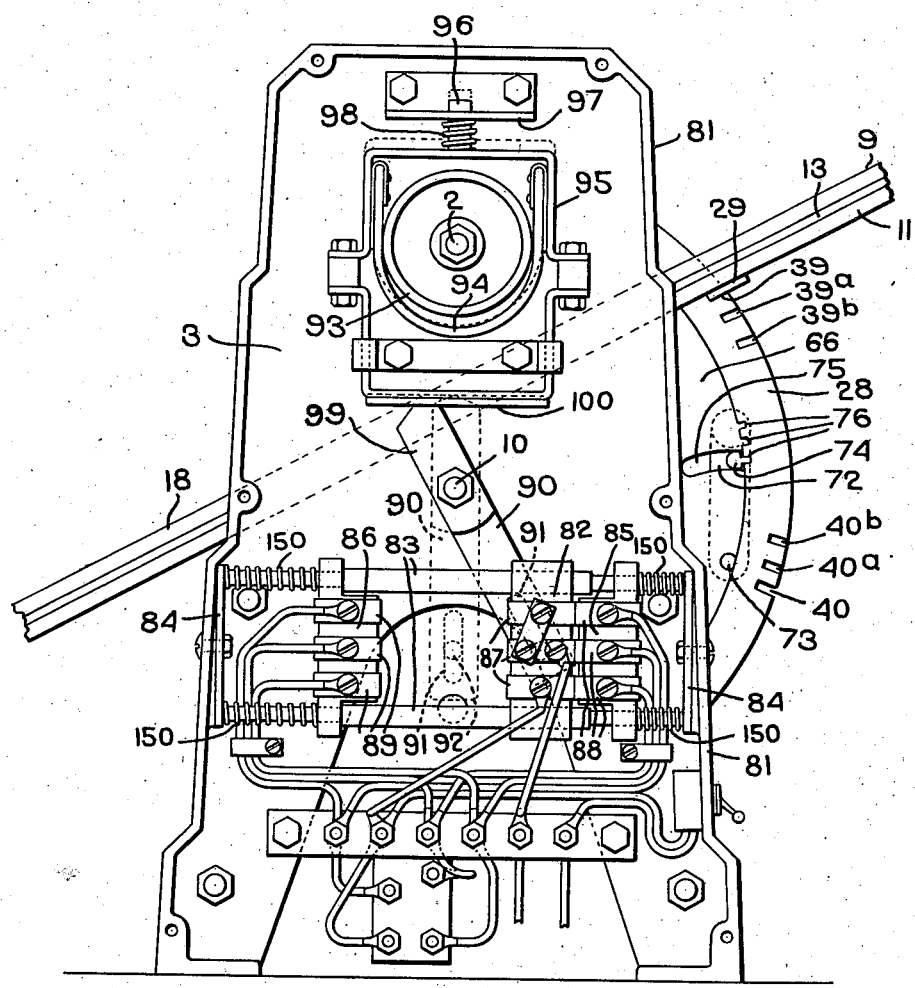
Fig. 2 is a view of the machine as seen from the opposite side with the cover plate of the end frame also removed.

With this adjustment the operator simply swings the platform from one position to the other and as there are only two open notches to receive the latch 29 the platform will always be brought into its correct position. If the guard 66 is an intermediate position then the notch 68 thereof will register with the notch 40a of the quadrant and the notch 70 of the guard will register with the notch 39a of the quadrant thereby to provide for locking the platform in the two positions required for cutting the slits in the meat of an intermediate depth. The guard member 66 has a locking member 72 pivoted thereto at 73 and provided with a locking dog 74 which extends through a slot 75 in the guard member and is adapted to engage any one of a plurality of notches 76 formed on the inner face of the quadrant 28, as shown in Fig. 2. The locking member 72 is yieldingly held in its locking position by a spring 77 and it is provided with a thumb-piece 78 by which it may be released from locking engagement with any notch 76.

I will preferably employ a reversible driving mechanism for the knives 1 which is constructed so that the direction of rotation thereof is reversed as the platform is swung from one inclined position to the other. This construction is adopted so that each time that the meat passes beneath the knives the portion of the knives engaging the meat will be moving in the same direction as the meat. For this purpose I propose to employ a reversing switch in the motor circuit which is actuated by the swinging of the platform from one inclined position to the other. Such a switch is illustrated in Fig. 2 and is connected to the end member 3 and is housed in the chamber 79 formed between said member and the cover plate 80 which is secured to the flange 81 of the end member. The reversing switch comprises a movable contact member 82 slidable back and forth on two guiding rods 83 which are supported by two plates 84 attached to the flange 81 of the end member 3. This sliding contact member 82 cooperates with two contact members 85 and 86 which are also carried by the supporting rods 83 and are backed by springs 150. The contact member 82 is provided with a plurality of contacts 87 adapted to engage either one set of cooperating contacts 88 on the contact member 85 or another set of cooperating contacts 89 on the contact member 86. When the contact member 82 is in the full line position shown in Fig. 2 with its contacts 87 engaging the contacts 88 of contact member 85, the motor will be running in one direction, but when the contact 82 is shifted to the left to bring its contacts 87 into engagement with the contacts 89 of the contact member 86 the motor will be running in an opposite direction.

Means are provided for shifting the contact member 82 from one position to the other by the rocking movement of the platform 9. For this purpose the shaft 10 of the platform has rigid therewith an arm 90 having a slot 91 therein in which is received a pin 92 extending from the contact member 82. Since the arm 90 is rigid with the platform 9 the swinging movement of the platform from one position to the other will swing the arm 90 and thereby move the contact member 82 from one extreme position to the other which will result in reversing the motor 5.

I have also provided means for applying a brake to the knife shaft between each reversal of the motor so that the shaft will be brought to rest while the platform 9 is being turned from one inclined position to the other.

The knife shaft 2 is shown as having a brake drum 93 thereon which is situated in the chamber 79. Cooperating with the brake drum is a brake member 94 which is carried in a vertically-moving yoke 95. The upper end of the yoke has a guiding stem 96 projecting therefrom which extends from and is guided by a flange 97 extending from the end wall 3. 98 is a spring encircling the stem 96 and which normally holds the yoke 95 in the lowered position shown in Fig. 2 with the brake 94 separated from the brake drum 93.

The arm 90 is provided with an extension 99, the upper end of which engages the lower face 100 of the yoke 95. When the platform 9 is turning from one inclined position to the other the extension 99 will have a corresponding turning movement about the axis 10, and as it swings from one extreme position into a central position the engagement of the upper end of the extension 99 with the under face 100 of the yoke will raise the latter and thereby apply the brake 94 to the brake drum 93. This will stop the rotation of the knife shaft and the motor due to inertia. As the platform completes its swinging movement the extension 99 will be swung into the other extreme position thereby releasing the brake. When the movement of the reversing switch has been completed the motor and knife shaft will be started from a position of rest.

101 indicates a cover member applied to the upper ends of the end frames 3 and 4 and which serves as a protection against the operator being injured by the knives 1. When, however, the platform is in the dotted line position, Fig. 1, or the full line position, Fig. 9, a considerable space will be open between the platform and the lower end 103 of the cover 101. To give added protection I have provided a guard plate 102 which is situated in front of the knives 1 and is connected to the platform so that when the end *a* of the platform is lowered as shown in Fig. 9 the guard member 102 will be drawn down in front of the knives. This guard plate 102 is carried by two supports 104, one at each end thereof, which supports are pivotally connected at 105 to the platform 9. The ends of the guard plate 102 are received in slots 106 formed in studs 107 that are secured to the frame ends 3 and 4 said slots operating as guides for the guard plate. As the platform is swung from one extreme position to the other the guard member 102 is moved up and down in guard slots 106. The lower edge 108 of the guard member is spaced sufficiently above the platform 9 to permit the turntable 17 with the slice of meat 16 thereon to pass beneath the guard member.

When the platform is in the inclined position shown in full lines, Fig. 1, the guard member will be in its raised position, but when the platform is swung into the oppositely-inclined position, shown in dotted lines, Fig. 1, or full line position, Fig. 9, the guard member will be pulled downwardly into position to function as a guard for the knives 1.

I claim:

1. A meat-slitting machine comprising a set of knives, a rocking platform beneath the knives swingable from a position in which one end is elevated to a reverse position in which the other end is elevated, a releasable latch device operable independently of the swinging movement of the platform to hold the platform in either of its inclined positions, and means to feed a slice of meat from the upper end to the lower end of the platform.

2. A meat-slitting machine comprising a set of knives, a rocking platform beneath the knives swingable from a position in which one end is elevated to a reverse position in which the other end is elevated, a meat-supporting turntable resting on and directly engaging the platform and having a sliding contact therewith from the elevated end thereof to the lower end, thereby to carry the meat to be slit beneath the knives, said turntable also being capable of having a turning movement about its axis while in contact with the platform, and means to give the turntable such turning movement.

3. A meat-slitting machine comprising a set of knives, a rocking platform beneath the knives swingable from a position in which one end is elevated to a reverse position in which the other end is elevated, a meat-supporting turntable movable on the platform from its elevated end to its lower end by which a slice of meat is carried beneath the knives, and means to turn the turntable by its initial movement away from one end of the platform.

4. A meat-slitting machine comprising a set of rotary knives, a rocking platform beneath the knives and swingable from an inclined position with one end elevated to a reversely-inclined position with the other end elevated, releasable locking means to hold the platform in either of its inclined positions, a meat-supporting turntable movable on the platform from its elevated end to its lower end, and means for turning the turntable after it has reached the lower end of the platform and said platform has been rocked into its reversely-inclined position.

5. A meat-slitting machine comprising a set of rotary knives, a rocking platform beneath the knives swingable from an inclined position with one end elevated to a reversely-inclined position with the other end elevated, releasable locking means to hold the platform in either of its inclined positions, a meat-supporting turntable movable on the platform from its elevated end to its lower end, and means for turning the turntable during its initial downward movement when the platform is in the reversely-inclined position.

6. A meat-slitting machine comprising a set of rotary knives, a rocking platform beneath the knives and swingable from an inclined position with one end elevated to a reversely-inclined position with the other end elevated, a meat-supporting table movable on the platform from its elevated end to its lower end, and a spring to initiate the downward movement of said table when the platform is in its reversely-inclined position.

7. A meat-slitting machine comprising a set of rotary knives, a rocking platform beneath the knives and swingable from an inclined position with one end elevated to a reversely-inclined position with the other end elevated, a meat-supporting table movable on the platform from its elevated end to its lower end, a spring to initiate the downward movement of said table when the platform is in its reversely-inclined position, means to energize the spring by the swinging movement of the platform, means for locking the platform in its reversely-inclined position, and means to release the spring simultaneously with the locking of the platform.

8. A meat-slitting machine comprising a set of rotary knives, a rocking platform beneath the knives and swingable from an inclined position with one end elevated to a reversely-inclined position with the other end elevated, a meat-supporting turntable movable on the platform from its elevated end to its lower end, a spring to initiate the downward movement of the turntable when the platform is in the reversely-inclined position, and means to turn the turntable during its spring-impelled movement.

9. A meat-slitting machine comprising a set of rotary knives, a rocking platform beneath the knives and swingable from an inclined position with one end elevated to a reversely-inclined position with the other end elevated, a meat-supporting turntable movable on the platform from its elevated end to its lower end, a spring to initiate the downward movement of the turntable when the platform is in its reversely-inclined position, means to energize the spring by the swinging movement of the platform, a dog to hold the spring energized, a locking latch for holding the platform in its reversely-inclined position, and means to release the dog simultaneously with the locking of the platform in its reversely-inclined position.

10. A meat-slitting machine comprising a set of rotary knives, an inclined platform beneath the knives, means to hold the platform at any one of a plurality of different inclinations, and means to feed the meat over the platform from the upper to the lower end thereof.

11. A meat-slitting machine comprising a set of rotary knives, an inclined platform beneath the knives, means to convey a slice of meat from the upper to the lower end of the platform thereby to slit the meat, and means to vary the inclination of the platform thereby to vary the depth of the cut.

12. A meat-slitting machine comprising a set of rotary knives, an inclined platform beneath the knives, a meat-supporting table movable from the upper to the lower end of the platform thereby to carry a slice of meat past the knives, and means to hold the platform at any one of a plurality of different inclinations thereby providing for cutting slits of different depths in the meat.

13. A meat-slitting machine comprising a set of rotary knives, a rocking platform beneath the knives swingable from an inclined position in which one end is elevated to a reversely-inclined position in which the other end is elevated, a meat-supporting table movable over the platform from its upper end to its lower end, and a releasable latch device for holding the table at the upper end of the platform.

14. A meat-slitting machine comprising a set of rotary knives, a rocking platform beneath the knives swingable from an inclined position in which one end is elevated to a reversely-inclined position in which the other end is elevated, a meat-supporting table movable over the platform from its upper end to its lower end, a releasable latch for holding the table at the upper end of the platform, and releasable locking means to hold the platform in either inclined position.

15. A meat-slitting machine comprising a set of rotary knives, a rocking platform beneath the knives swingable from an inclined position in which one end is elevated to a reversely-inclined position in which the other end is elevated, a meat-supporting table movable over the platform from its upper end to its lower end, a releasable latch for holding the table at the upper end of the platform, and means for simultaneously locking the platform in its inclined position and releasing said latch.

16. A meat-slitting machine comprising a set of rotary knives, a rocking platform beneath the knives swingable from one inclined position to a reversely-inclined position, a meat-supporting table movable gravitationally from the upper to the lower end of the platform, and means to initiate the gravitational movement of the table from the upper end of the platform when the latter is in its reversely-inclined position.

17. A meat-slitting machine comprising a set of rotary knives, a rocking platform beneath the knives swingable from a position in which one end is elevated to a position in which the other end is elevated, means for rotating the knives, means to feed a slice of meat from the elevated end of the platform to the lower end thereby to carry the meat beneath the knives, and means operated by the movement of the platform from one inclined position to the reverse inclined position to reverse the direction of rotation of the knives.

18. A meat-slitting machine comprising a set of rotary knives, a rocking platform beneath the knives swingable from a position in which one end is elevated to a position in which the other end is elevated, means for rotating the knives, means to feed a slice of meat from the elevated end of the platform to the lower end thereby to carry the meat beneath the knives, means operated by the movement of the platform from one inclined position to the reverse inclined position to reverse the direction of rotation of the knives, and means to apply a braking action to the rotary knives when the platform is in an intermediate position.

19. A meat-slitting machine comprising a set of rotary knives, a rocking platform beneath the knives swingable from a position in which one end is elevated into a position in which the other end is elevated, means to convey a slice of meat from the elevated end of the platform to the lower end thereof, a motor for rotating the knives, and means to reverse the motor by the movement of the platform from one inclined position to the other.

20. A meat-slitting machine comprising a set of rotary knives, a rocking platform beneath the knives swingable from a position in which one end is elevated to a reversely-inclined position in which the other end is elevated, means to convey a slice of meat from the upper to the lower end of the platform, and a guard member connected to the platform and movable into knife-guarding position when the platform is in its reversely-inclined position.

21. A meat-slitting machine comprising a set of rotary knives, a rocking platform beneath the knives swingable from a position in which one end is elevated into a reversely-inclined position in which the other end is elevated, and a vertical movable guard plate situated in front of the knives and connected to the platform and movable into knife-guarding position by the platform when the latter is moved into its reversely-inclined position.

22. A meat-slitting machine comprising a set of rotary knives, a rocking platform beneath the knives swingable from a position in which one end is elevated to a reverse position in which the other end is elevated, means for rocking the platform, locking means independent of the platform-rocking means to lock the platform in either of its inclined positions, and means to feed a slice of meat from the upper end to the lower end of the platform.

23. A meat-slitting machine comprising a set of knives, a rocking platform beneath the knives adapted to rock from a position in which one end is elevated to a reverse position in which the other end is elevated, a meat-supporting turntable resting directly on the platform and slidable thereover from the elevated end thereof to the lower end thereby to carry the meat to be slit beneath the knives, said platform having a guiding slot and the turntable having a stud depending therefrom and extending through the slot, and means to turn the turntable.

24. A meat-slitting machine comprising a set of knives, a rocking platform beneath the knives adapted to rock from a position in which one end is elevated to a reverse position in which the other end is elevated, a meat-supporting turntable resting directly on the platform and slidable thereover from the elevated end thereof to the lower end thereby to carry the meat to be slit beneath the knives, and means for turning the turntable during its initial feeding movement after the platform has been moved into its reversely-inclined position.

25. A meat-slitting machine comprising a set of knives, a rocking platform beneath the knives swingable from a position in which one end is elevated to a reverse position in which the other end is elevated, a manually-releasable latch device operable independently of the swinging movement of the platform to hold the latter in either of its inclined positions, and means to feed a slice of meat from the upper end to the lower end of the platform.

26. A meat-slitting machine comprising a set of knives, a rocking platform beneath the knives swingable from a position in which one end is elevated to a reverse position in which the other end is elevated, a meat-supporting turntable resting directly on the platform and slidable thereover from the elevated end thereof to the lower end thereby to carry the meat to be slit beneath the knives, means to turn the turntable by its initial movement away from one end of the platform, and means to hold the turntable against turning movement during the remainder of its movement over the platform.

27. A meat-slitting machine comprising a set of knives, a platform beneath the knives, said platform having a slot extending lengthwise thereof, a meat-supporting turntable resting directly on the platform and movable thereover from one end thereof to the other thereby to carry a slice of meat beneath the knives, said turntable having a stud extending through the slot, means to give the turntable its turning movement at one portion of its travel over the platform, a guiding rail on the under side of the platform, and means associated with said stud and cooperating with the guide rail to prevent turning movement of the turntable during the remainder of its journey.

JOSEPH P. SPANG.